US009360007B2

(12) United States Patent
Lindekleiv

(10) Patent No.: US 9,360,007 B2
(45) Date of Patent: *Jun. 7, 2016

(54) PISTON PUMP

(71) Applicant: Arne Lindekleiv, Vennesla (NO)

(72) Inventor: Arne Lindekleiv, Vennesla (NO)

( * ) Notice: Subject to any disclaimer, the term of this patent is extended or adjusted under 35 U.S.C. 154(b) by 0 days.

This patent is subject to a terminal disclaimer.

(21) Appl. No.: 14/325,020

(22) Filed: Jul. 7, 2014

(65) Prior Publication Data

US 2014/0322037 A1  Oct. 30, 2014

Related U.S. Application Data

(63) Continuation of application No. 12/738,613, filed as application No. PCT/NO2008/000369 on Oct. 16, 2008, now Pat. No. 8,770,091.

(30) Foreign Application Priority Data

Oct. 17, 2007 (NO) .................................. 20075302

(51) Int. Cl.

| *F04B 15/02* | (2006.01) |
| *F16J 1/08* | (2006.01) |
| *F04B 53/02* | (2006.01) |
| *F04B 53/14* | (2006.01) |
| *F04B 53/16* | (2006.01) |
| *F16J 1/00* | (2006.01) |
| *F16J 15/40* | (2006.01) |

(52) U.S. Cl.
CPC ................. *F04B 53/02* (2013.01); *F04B 15/02* (2013.01); *F04B 53/143* (2013.01); *F04B 53/162* (2013.01); *F16J 1/008* (2013.01); *F16J 1/08* (2013.01); *F16J 15/40* (2013.01)

(58) Field of Classification Search
CPC .......... F04B 5/143; F04B 15/02; F04B 53/02; F04B 53/143; F16J 1/003; F16J 15/40; F16J 15/162; F16J 15/3404
USPC ............. 92/174, 182, 242, 251; 277/436–438
See application file for complete search history.

(56) References Cited

U.S. PATENT DOCUMENTS

| 2,367,185 | A | | 1/1945 | Cary |
| 3,720,140 | A | | 3/1973 | Lee |
| 4,023,469 | A | | 5/1977 | Miller |
| 4,270,440 | A | | 6/1981 | Lewis, II |
| 4,449,897 | A | | 5/1984 | Garrett |
| 4,476,771 | A | | 10/1984 | Kao |
| 4,598,630 | A | * | 7/1986 | Kao ................................ 92/78 |
| 8,770,091 | B2 | | 7/2014 | Lindekleiv |
| 2004/0244577 | A1 | | 12/2004 | Haughom |

FOREIGN PATENT DOCUMENTS

DE  2853347  6/1980

* cited by examiner

*Primary Examiner* — Bryan Lettman
*Assistant Examiner* — Philip Stimpert
(74) *Attorney, Agent, or Firm* — Eubanks PLLC

(57) ABSTRACT

A piston pump is provided comprising a cylinder with an inner cylinder wall and a working space. The piston pump includes a piston inside the cylinder and has a piston head with a first and second projections extending from its lateral surface to the cylinder wall. These first and second projections enclose a cavity between the piston head and the cylinder wall. The piston head also includes a channel for routing a flushing fluid to the cavity. The first and second projections are configured to promote flow of the flushing fluid out of the cavity and into the working space of the cylinder.

19 Claims, 2 Drawing Sheets

PISTON PUMP

BACKGROUND

This disclosure relates to a piston pump, especially a piston pump for pumping a liquid containing solid particles such as for pumping drilling mud in connection with recovery of hydrocarbons.

When pumping liquids containing solid particles the problem of wear arises due to the fact that the solid particles in the liquid become lodged between the piston and the cylinder. The wear occurs on both piston and cylinder after a period of use when the particles become lodged between the piston and the cylinder, resulting in the beginnings of a "scratch" in the cylinder wall. Once a scratch has started, larger particles will be deposited in the scratch and as time goes by there will be a leakage of drilling mud under high pressure. The piston must then be replaced. The cylinder is expected to have to be replaced after two piston replacements.

In order to reduce the wear, pumps can be equipped with a flushing system. This can include a pump with reservoir and a hose up to the rear of the piston where a casing with nozzles is installed. The nozzles spray water or oil, flushing cylinder and piston. However, there are still considerable expenses involved in replacing these parts relatively often.

From the prior art in the field we may mention U.S. Pat. Appl. No. 2004/0244577 A1 disclosing a piston pump which pumps liquid containing sand particles. The piston is provided with two seals 24 and 58. Between these packings an annular space 56 is formed which is supplied with a liquid through a bore 54 from a bore 36 passing centrally through the piston. The annulus 56 is pressurized thereby subjecting the seal 24 to the same pressure on both sides of the seal. Thus liquid will essentially not flow out of the annulus.

U.S. Pat. No. 4,598,630 discloses a double acting mud pump comprising an assembly of three pistons which are provided on a piston rod, a first (middle) piston and a second (left) piston and a third (right) piston which are provided movably in the axial direction on either side of the first piston. Between the third and the first piston a first chamber is created (C1) and between the second piston and the first piston a second chamber (C2) is created wherein the volume of the two chambers varies with the position of the second and the third pistons. A fluid is supplied to the chambers C1 and C2 through ducts in the piston rod. The pistons are provided with sealing elements which provide sealings between the piston and the cylinder.

U.S. Pat. No. 4,476,771 has the same applicant as U.S. Pat. No. 4,598,630, and discloses a very similar pump, but somewhat simpler in construction. The disclosed pump comprises a first (left) piston which is fixed on a piston rod and a second (right) piston which is attached axially movable on the piston rod relative to the first piston rod. This pump does not have any ducts at all for the supply of a fluid to a chamber (with a variable volume) which is created between the two pistons. The fluid is instead supplied by letting the fluid flow into the chamber between the second piston and the cylinder wall during the return stroke of the pump.

U.S. Pat. No. 4,270,440 discloses a drilling mud pump where a seal 74 with a gap filler 78 and a wear band 92 are mounted in the piston. These protrude further out than the rest of the piston, thereby forming an annulus 90 between the piston and the cylinder wall and the two seals. Water is supplied to this annulus through water channels 88 in the gap filler 78 and the channel 34. The wear band 92 is arranged with helically shaped ridges 94 and grooves 96, thus enabling the water to flow through the seal 92 and out at the rear of the piston in such a manner that, on account of the helically shaped grooves 96, the water obtains a rotating motion which flushes the cylinder wall when the water flows through the grooves 96 and out at the rear of the piston.

U.S. Pat. No. 3,720,140 discloses a drilling mud pump where the piston head is provided at its rear edge with a flange 15 which has a very small clearance to the cylinder wall. On the piston head, in front of the flange, a seal 20 is mounted to provide a seal against the cylinder wall. On the outer edge of the flange an annular groove is provided which during use can be supplied with a liquid under high pressure through a hose 31. According to the description the liquid is then forced through the small clearance between the flange and the cylinder, forming a thin film behind the piston. This film cools, cleans and lubricates during the piston's return stroke. Insofar as there is a flow of liquid, a thin film in this case, the liquid will substantially flow out behind the piston.

U.S. Pat. No. 2,367,185 discloses a drilling mud piston where the inside of the piston is equipped with an inner 35 and an outer ring 35', and outside the inner ring 35 an inner wiping disk 39 and outside the outer ring 35' an outer wiping disk 39'. Between the inner ring and the inner wiping disk there is an annulus which is supplied with a liquid through channels in the piston rod. Correspondingly, there is an annulus between the outer ring and the outer wiping disk 39' which can be supplied with a liquid through channels in the piston rod. When the piston moves to the right, a negative pressure is created on the left side of the piston which draws water into the annulus (between inner ring 35 and inner wiping disk 39) and on into the cylinder (liner) 2 past the outer edge of the wiping disk 39. Correspondingly a negative pressure is created on the right side of the piston when it moves to the left, drawing water into the annulus (between outer ring 35' and outer wiping disk 39') and on into the cylinder past the outer edge of the wiping disk 39'.

Since there is no pressurized liquid in the annuli (the liquid is sucked into the return stroke by means of the negative pressure created) and the liquid which is sucked in can flow past the wiping disks 39, 39', drilling mud will probably penetrate the annuli during the pump stroke. No mention is made of whether these wiping disks should be designed to permit liquid to flow past in one direction and prevent liquid from flowing past in the opposite direction. Nor is there any indication in the figures that the wiping disks are so designed.

SUMMARY

Certain aspects of presently disclosed piston pump embodiments are summarized below. In one embodiment, a piston pump is provided, comprising a cylinder with an inner cylinder wall and at least one working space including at least one fluid intake and at least one fluid outlet. The piston pump further comprises a piston which is arranged in the cylinder on a piston rod. The piston comprises a piston head including a lateral surface facing the cylinder wall and with a diameter which is smaller than the cylinder's internal diameter, a front surface facing the working space and a rear surface. The piston head's lateral surface is further provided with a first projection and a second projection, both extending round the entire circumference of the lateral surface. The first and the second projections have respective external diameters when the projections are not subjected to an external load or pressure which reduces their diameters (for example before the piston is mounted in the cylinder) which are preferably larger than the cylinder's internal diameter, with the result that the first and the second projections are in contact with the cylinder wall when the piston is mounted in the cylinder. An annulus is thereby formed between the first projection, the second projection, the cylinder wall and the cylinder head's lateral surface between the first and the second projections if the piston head is designed so that the projections are arranged with an axial spacing between them in the cylinder's longitudinal direction. The first and the second projections are designed so that a pressurized liquid located in the annulus will substantially flow into the cylinder's working space. The piston head is further provided with at least one piston head channel which provides fluid communication between preferably the piston head's rear surface, possibly the piston head's lateral surface behind the second projection and the annulus, thereby enabling liquid-state fluid to be supplied to the annulus.

The first and the second projections may be provided on the piston head in such a manner that they are placed directly behind each other, i.e. without axial spacing between them. Alternatively, the first and the second projections may be arranged spaced axially apart on the piston head. A part of the piston head's lateral surface will then be located between the first and the second projections. This part of the piston head's lateral surface may have a cylindrical shape where the lateral surface is parallel to the pump's center axis, or possibly a more or less conical shape where the piston head's lateral surface is not parallel to the pump's center axis. Another alternative is for the piston head's lateral surface between the first and the second projections to be curved.

It is also possible to envisage the first and the second projections designed in such a way that together they cover the entire lateral surface of the piston head. It may be envisaged that the projections in this embodiment are designed so that they cover the entire lateral surface of the piston head apart from being provided with an axial spacing between them.

The first projection is so defined that it is located nearer the working space than the second projection. Since the two projections are in contact with the cylinder wall on the inside, two angles $\alpha$ and $\beta$ may also be defined in the annulus. In an axial section through the piston pump where the section is taken so that the piston pump's center axis lies in the same plane as the section, the angle $\alpha$ is the angle defined by the cylinder wall and the part of the first projection facing the annulus and is in contact with the cylinder wall at one end. In the same axial section the angle $\beta$ is defined as the angle between the cylinder wall and the part of the second projection facing in towards the annulus and is in contact with the cylinder wall at one end. If the sides of the first and the second projections are curved, the angle $\alpha$ will be defined as the angle between the cylinder wall and the tangent of the curved side of the first projection at the point where the first projection comes into contact with the cylinder wall nearest the annulus.

Correspondingly, the angle $\beta$ can be defined as the angle between the cylinder wall and the tangent of the curve side of the second projection at the point where the second projection comes into contact with the cylinder wall nearest the annulus.

The first and the second projections are designed so that a liquid located in the annulus will substantially flow out into the cylinder's working space and not backwards and out at the rear of the piston's piston head. The first projection is therefore designed so that the angle $\alpha$ in the annulus is less than 90°.

In general it can be said that the smaller the angle, the more easily the liquid in the annulus will flow into the cylinder's working space. Thus in a preferred embodiment the angle $\alpha$ is in the range 2-30°.

In order to further avoid the liquid in the annulus flowing backwards out of the annulus and out behind the piston head, the second projection is designed so that the angle $\beta$ in the annulus is at least equal to 90°. In order to further reduce the possibility of the liquid in the annulus flowing out backwards, in an embodiment the second projection is designed so that the angle $\beta$ is greater than 90°, preferably in the range 90-150°.

In order to reduce the possibility of the liquid with particles which is being pumped flowing in between the first projection and the cylinder wall, at least a part of the piston head's front surface has a concave shape. In an embodiment the whole front surface is concave in shape. In an alternative embodiment a part of the front surface is concave in shape. The remaining part of the front surface may, e.g., be flat. When only a part of the front surface is concave, it is preferably the outer part of the front surface from the front surface's end edge towards the cylinder wall and a distance in towards the pump's center axis which is concave, while a central area of the front surface, within the concave part of the front surface, for example, may be flat.

The piston head, including the first and the second projections, is preferably made of an elastic material, such as a rubber material. The piston head and the first and the second projections are also provided as a single, integrated unit, i.e. packings or similar elements mounted on the piston head do not form part of the first and the second projections. It could be desirable to design the projections so that they are slightly more elastic than the rest of the piston head. For this reason it is also possible to design the piston head, with the projections, so that it has a varying elasticity.

Since the piston head is preferably made of an elastic material, the piston is provided with a piston head rest against which the piston head's rear surface abuts. The shape of the piston head rest's surface facing the piston head matches the shape of the piston head's rear surface. Both surfaces are preferably substantially flat surfaces.

The piston head rest's diameter is substantially the same as the piston head and is smaller than the cylinder's internal diameter. The piston head also has a diameter, measured diametrically outside the projections, which is less than the cylinder's internal diameter. On the piston it is therefore only the outer edges of the first and the second projections, i.e. those parts of the projections located furthest from the pump's center axis, which are in contact with the inner cylinder wall.

In order for the annulus to be supplied with a liquid under pressure, such as water or an oil, the piston head rest is provided with at least one through-going piston head rest channel extending in the cylinder's longitudinal direction from the piston head rest's surface facing the piston head to the rear of the piston head rest. The piston head rest channel is in fluid contact with the at least one piston head channel on the side of the piston head rest facing the piston head. On the rear of the piston head rest the at least one piston head channel is in fluid contact with a hose or another suitable means for delivering the liquid-state fluid. In this way the liquid-state fluid can be delivered to the annulus.

In an embodiment the piston head's rear surface or the piston head rest's surface facing the piston head is provided with a ring channel in the surface, i.e. a groove in the surface extending round the piston head's rear surface and/or the piston head's surface in a circumferential direction. A flow channel is thereby formed for fluid flow when the piston head abuts the piston head rest. If both the piston head's rear surface and the piston head rest's surface are provided with ring channels, their shape and size match each other so that they form one ring channel when the piston head's rear surface abuts the piston head rest. In such an embodiment the at least one piston head channel will extend from the annulus to the ring channel and the at least one, through-going piston head rest channel will discharge into the ring channel. A liquid-state fluid can thereby be supplied to the annulus.

The piston pump may be designed as a simple pump with a working space and a piston. Alternatively, the pump's piston rod may be provided with a piston head at both ends whereby the piston pump is provided with either one cylinder wherein the piston rod with the piston heads is arranged so that a working space is formed at each end of the cylinder, or two cylinders where each of the piston heads is each arranged in its own cylinder.

A further alternative is to design the pump so that the piston rod is through-going through a cylinder comprising two or more working spaces and where a piston head is provided on the piston rod in each working space.

It is also possible to provide the pump's cylinder with two working spaces, with one working space on each side of the piston. In this case the piston head rest may be provided with two piston heads, one on each side of the piston head rest, with the result that the two piston heads' front surfaces each face in an axial direction towards their respective working spaces. In this embodiment the piston pump will pump when the piston moves in both directions. The supply of liquid to the piston heads' annulus may be implemented through a channel in the piston rod on to the ring channels or the piston head channels which will be provided in connection with the two piston heads.

BRIEF DESCRIPTION OF THE DRAWINGS

Certain embodiments will now be described in detail with reference to the attached figures, in which.

DETAILED DESCRIPTION OF SPECIFIC EMBODIMENTS

Figure 1:
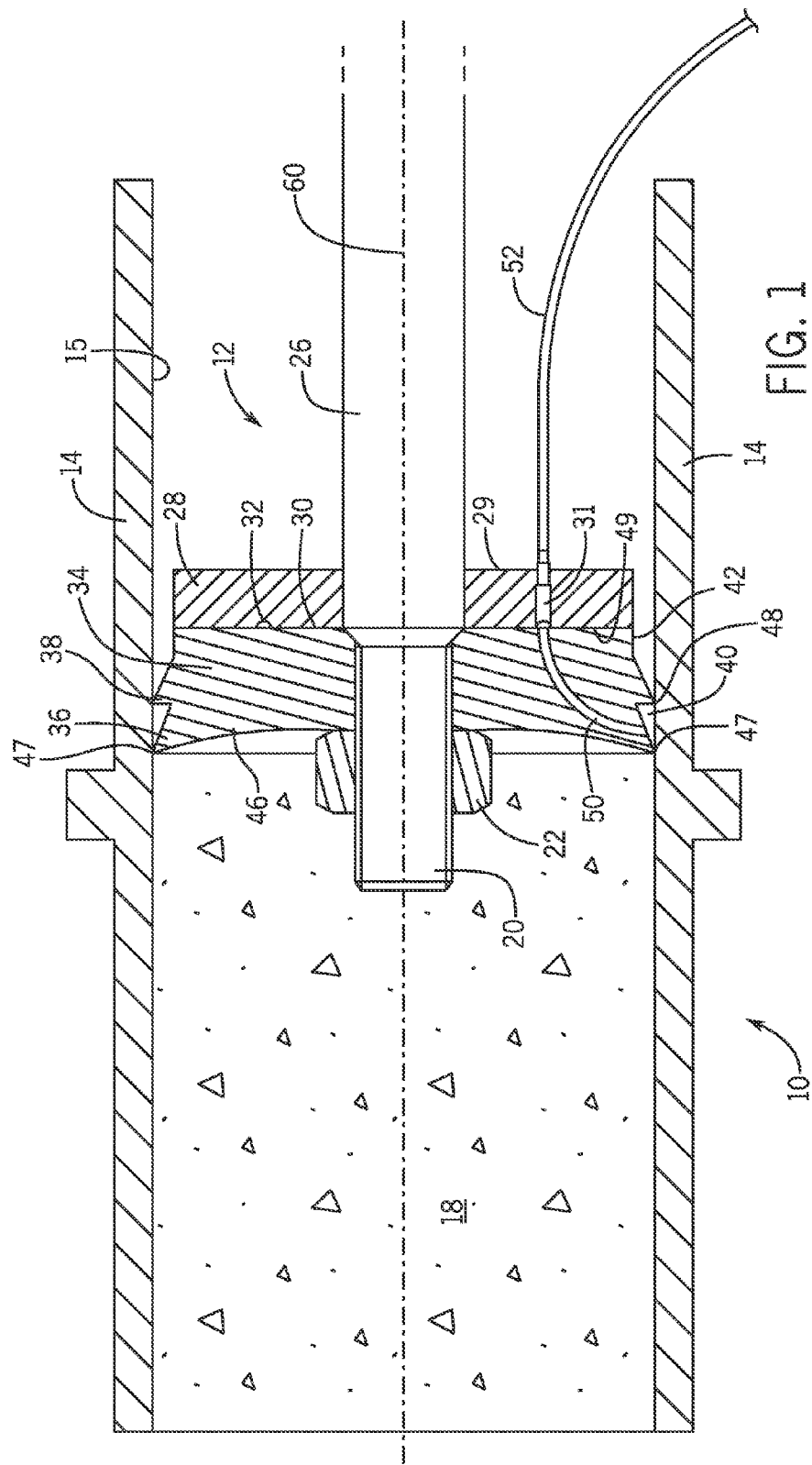
FIG. 1 is an axial cross section of an embodiment of the piston pump.

FIG. 1 illustrates a piston pump 10 for pumping a liquid containing solid particles, such as for example drilling mud, where the liquid constitutes a problem with regard to wear on the pump. The piston pump 10 comprises at least one cylinder 14 and a piston 12 which is arranged in the cylinder 14.

The piston 12 comprises a piston rod 26 and a piston head rest 28 which is securely mounted on the piston rod 26. Furthermore, a piston head 34 is mounted on the piston head rest 28. This may be done in various ways, for example as illustrated in FIG. 1 where the piston head 34 is provided with a through-going hole which is coaxial with the pump's center axis 60 and has a diameter corresponding to the piston rod's diameter. The piston head is slid on to the piston rod, which is provided with a bolt part 20 with threads at the end, so that the piston head's rear surface 49 abuts the piston head rest's front piston head rest surface 30 and is fastened by a nut 22 which is screwed on to the bolt part 20, pressing the piston head 34 against the piston head rest 28.

The piston head 34 is provided with a lateral surface 42, a rear surface 49 and a front surface 46. As indicated above, the rear surface 49 abuts the piston head rest 28. The front surface 46 faces out towards the cylinder's 14 working space 18 where the liquid which has to be pumped is located. The cylinder is equipped with one or more fluid intakes and one or more fluid outlets (not shown in the figure) for intake and discharge of the liquid. In the embodiment illustrated in FIG. 1, the front surface 46 has a partly concave shape where the front surface 46 has a concave shape out towards the piston head's 34 outer edge and a substantially flat shape centrally round the bolt part 20. In an alternative embodiment the whole front surface 46, for example, may be flat or the whole front surface 46 may be concave.

As illustrated in FIG. 1, the piston head 34 has a substantially cylindrical shape where the lateral surface 42 is parallel to the cylinder's inner wall 15, and has a diameter which is smaller than the cylinder's 14 internal diameter. It is also possible to give the piston head 34 another shape, for example a conical shape, with the result that the lateral surface 42, in at least a part of its axial extension, is not parallel to the cylinder's 14 inner wall 15.

The piston head 34 is further provided with a first projection 36 and a second projection 38. Both the projections 36, 38 protrude from the cylinder head's lateral surface 42, extending round the entire circumference of the cylinder head. The outermost part of the projections 36, 38 comprises an end edge 47 on the first projection 36 and an end edge 48 on the second projection 38. Before the piston 12 is mounted in the cylinder 14, i.e. when the projections 36, 38 are not subjected to an external load or pressure which reduces the end edges' 47, 48 diameter, the end edges 47, 48 have a diameter which is larger than the cylinder's 14 internal diameter. The piston head 34 and the projections 36, 38 and thereby the end edges 47, 48 are made of an elastic material and therefore abut the cylinder's inner wall 15, thereby forming an annulus 40 which is defined by the first projection 36, the second projection 38, the cylinder's inner wall 15 and possibly the cylinder head's lateral surface 42 if the first and second projections are mounted on the cylinder head's lateral surface 42 with an axial spacing (i.e. in the cylinder's longitudinal direction) between them. In FIG. 1 the first projection 36 and the second projection 38 are shown provided without such an axial spacing between them.

The first projection 36 is located nearer the cylinder's 14 working space 18 than the second projection 38. The first projection 36 is preferably mounted right at the front on the piston head 34, as illustrated in FIG. 1, but may of course be mounted further back on the piston head 34 if so desired. When the first projection is mounted at the front on the piston head's lateral surface 42, as illustrated in FIG. 1, the side of the first projection 36 facing the working space will form a part of the piston head's front surface 46.

In the piston head 34 there is also provided a piston head channel 50 extending between the annulus 40 and the piston head's rear surface 49. In the piston head rest 28 there is provided a corresponding, axially through-going piston head rest channel 31 which is connected at the rear piston head rest surface 29 to a fluid supply means 52 for delivering fluid. This fluid supply means may, for example, be a hose. If only one piston head channel 50 is provided in the piston head 34, this and the piston head rest channel 31 are arranged in such a way that a fluid can flow through the piston head rest channel 31 into the piston head channel at the transition between the piston head rest 28 and the piston head 34.

An alternative is to provide two or more piston head channels 50 from the annulus 40 to the piston head's rear surface 49. In order to avoid a corresponding number of piston head rest channels 31 and fluid supply means 52, in the front piston head rest surface 30 a ring channel 32 may be provided to supply fluid through the piston head rest channel 31 extending between the ring channel 32 and the rear piston head rest surface 29 where the fluid supply means 52 is connected to the piston head rest channel 31. The ring channel 32 is preferably in the form of a groove in the front piston head rest surface 28 and is designed so that all the piston head channels 50 are in fluid contact with the ring channel 32 when the piston head 34 abuts the piston head rest 28. The annulus 40 is thereby guaranteed a steady supply of fluid round its entire circumference.

An alternative to providing the ring channel 40 at the front of the piston head rest surface 30 is to provide the ring channel 40 as a groove in the piston head's 34 rear surface 49 in such a manner that the piston head rest channel 31 discharges into the ring channel 40 when the piston head 34 abuts the piston head rest 28.

Another alternative is to provide the ring channel 32 in two parts in the form of a groove in the front piston head rest surface 30 and a corresponding groove in the piston head's rear surface 49, thereby forming a complete ring channel 32 when the piston head 34 abuts the piston head rest's 28 front piston head rest surface 30.

Figure 2:
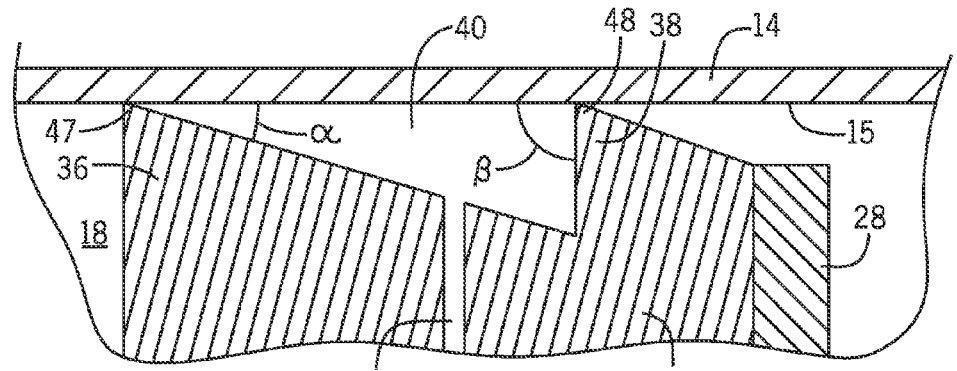
FIGS. 2-4 illustrate three possible embodiments of the piston head's annulus.
Figure 3:
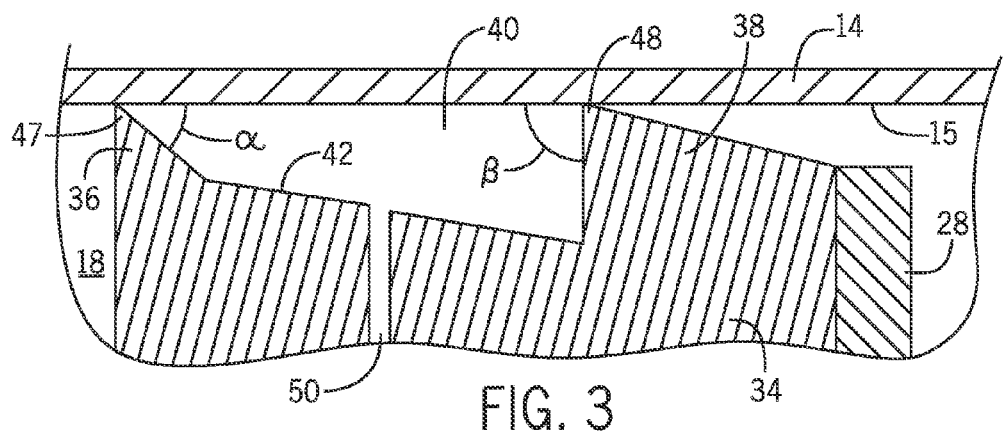
Figure 4:
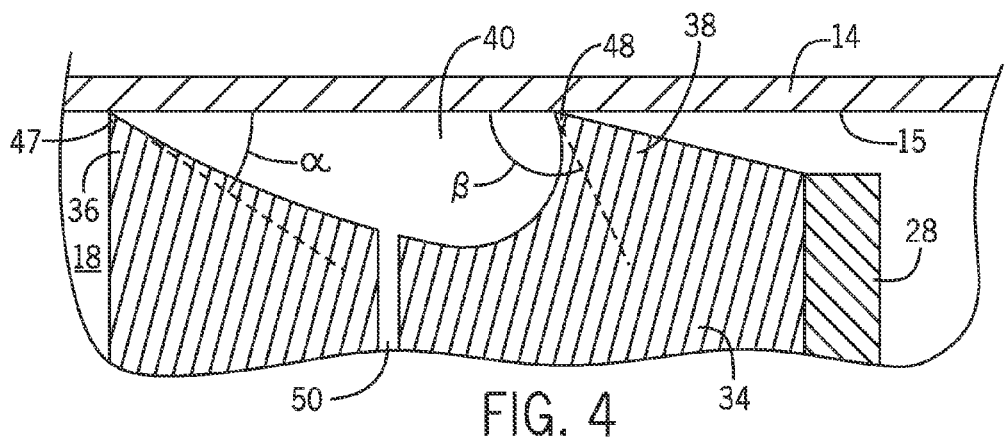

In FIGS. 2-4 three alternative embodiments of the annulus 40 are illustrated. In FIG. 2 the first projection 36 and the second projection 38 are mounted on the piston head 34 without an axial spacing between them. The annulus 40 is therefore defined by the two projections 36, 38 and the cylinder's inner wall 15. The piston head 34 abuts the piston head rest 28 and the piston head channel 50 supplies a fluid under pressure to the annulus 40.

As shown in FIG. 2, which is an axial cross section through the pump's 10 center axis 60 (see FIG. 1), the angle $\alpha$ between the first projection 36 and the cylinder's inner wall 15, and located in the annulus, is less than 90°. The angle is preferably considerably less than 90°. Correspondingly, the angle $\beta$ between the second projection 38 and the cylinder wall 15, and located in the annulus, is greater than or equal to 90°. By designing the projections 36, 38 in this way, a liquid located in the annulus 40 will substantially flow out into the cylinder's working space 18 between the first projection 36 and the cylinder wall 15, thereby flushing the cylinder wall. In this embodiment of the invention the two projections 36, 38 cover the entire lateral surface 42 of the piston head 34.

FIG. 3 illustrates an embodiment of the annulus 40 where the first projection 36 and the second projection 38 are arranged with an axial spacing between them. In this embodiment the part of the lateral surface 42 located between the projections 36, 38 is not parallel to the cylinder wall 15, but the lateral surface 42 may of course be designed so that it is parallel to the cylinder wall 15 if so desired. In the same way as illustrated in FIG. 2, the angles $\alpha$ and $\beta$ between the first projection 36 and the cylinder's inner wall 15 and the second projection 38 and the cylinder wall 15 respectively, are less than 90° and greater than or equal to 90° respectively. The angle $\alpha$ is preferably considerably less than 90°, so that the liquid located in the annulus 40 will substantially flow out into the cylinder's working space 18 between the first projection 36 and the cylinder wall 15.

In FIG. 4 a further embodiment of the annulus 40 is illustrated, where the first projection 36 and the second projection 38 are curved in shape. In this embodiment the two projections 36, 38 are provided without an axial spacing between them, which can be seen in the figure, but the projections may of course be provided spaced axially apart where the part of the lateral surface 42 located between the two projections 36, 38, viewed in an axial section, may be rectilinear or curved. The angles $\alpha$ and $\beta$ between the first projection 36 and the cylinder wall 15 and the second projection 38 and the cylinder wall 15 respectively are then defined as the angle between the cylinder wall 15 and the tangent of the curved surfaces of the projections 36, 38 (in an axial section through the center axis 60) at the point where the projections 36, 38 come into contact with the cylinder wall 15. This is clearly illustrated in FIG. 4. In practice the surfaces of both projections 36, 38 and possibly the lateral surface 42 may be curved. Alternatively, one or two of the surfaces of the projections 36, 38 and possibly the lateral surface 42 may be curved. For this embodiment of the annulus too the angles $\alpha$ and $\beta$ between the first projection 36 and the cylinder wall 15 and the second projection 38 and the cylinder wall 15 respectively are less than 90°, and greater than or equal to 90° respectively. The angle $\alpha$ is preferably considerably less than 90° so that the liquid located in the annulus 40 substantially flows out into the cylinder's working space 18 between the first projection 36 and the cylinder wall 15.

In FIG. 4 both the first and the second projections 36, 38 are provided with curved surfaces which are convex. Naturally, it is possible to provide one or both the projections 36, 38 with convex surfaces if so desired. When the surfaces of the projections have a convex shape, the angles $\alpha$ and $\beta$ will be defined in a manner corresponding to that when the surfaces of the projections have a concave shape.

For the record, it should be emphasized that when discussing the projections' 36, 38 possibly curved, i.e. concave or convex, surfaces, this is viewed in a plane which is an axial section through the piston pump in which the center axis 60 is located. Since the piston head is cylindrical, double-curved surfaces will therefore be obtained on the projections 36, 38 when they are provided with concave or convex surfaces as illustrated in FIG. 4.

Furthermore, it should also be stressed that the angle which, viewed in an axial cross section through the center axis 60, is formed by the first projection 36 and the cylinder wall 15 and which faces the cylinder's working space 18, in the same way as the angle $\beta$ in the annulus 40, is preferably greater than 90° in order to reduce the chance of the liquid with solid particles in the working space 18 penetrating between the first projection 36 and the cylinder wall 15. In an embodiment where the first projection 36 is mounted right at the front of the lateral surface 42 and the front surface 46 has a concave shape, as illustrated in FIG. 1, this angle will automatically become greater than 90°.

The invention claimed is:
1. A piston pump comprising:
   a cylinder with an inner cylinder wall and at least one working space; and
   a piston inside the cylinder and including a piston head which is provided with a lateral surface facing the cylinder wall and a front surface facing the working space, the piston head's lateral surface being provided with a first projection and a second projection extending round the entire circumference of the lateral surface and abutting the cylinder wall, thereby forming an annulus between the piston head and the cylinder wall which is delimited by the projections in the axial direction, wherein: the piston head and the projections are provided in an elastic material and as a single integrated unit, in that the projections are not formed with separate packings mounted on the piston head; the piston head is provided with at least one piston head channel for delivery of a pressurized fluid to the annulus; and the first and second projections are configured to facilitate flow of the pressurized fluid out of the annulus past the first projection rather than past the second projection during operation of the piston pump.
2. The piston pump of claim 1, wherein the piston is provided with a piston head rest which is mounted on a piston rod and against which a rear surface on the piston head abuts.

3. The piston pump of claim 1, wherein the first projection is located nearer the working space than the second projection and that an angle α in the annulus is less than 90°, where the angle α, in an axial cross section through the cylinder's longitudinal center axis, lies between the first projection and the cylinder wall.

4. The piston pump of claim 1, wherein the first projection is located nearer the working space than the second projection and that an angle α in the annulus is in the range 2-30°, where the angle α, in an axial cross section through the cylinder's longitudinal center axis, lies between the first projection and the cylinder wall.

5. The piston pump of claim 1, wherein the first projection is located nearer the working space than the second projection and that an angle β in the annulus is greater than or equal to 90°, where the angle β, in an axial cross section through the cylinder's longitudinal center axis, lies between the second projection and the cylinder wall.

6. The piston pump of claim 1, wherein the first projection is located nearer the working space than the second projection and that an angle β in the annulus is in the range 90-150°, where the angle β, in an axial cross section through the cylinder's longitudinal center axis, lies between the second projection and the cylinder wall.

7. The piston pump of claim 1, wherein the piston head channel extends between the annulus and a rear surface on the piston head.

8. The piston pump of claim 1, wherein at least a part of the piston head's front surface is concave in shape.

9. The piston pump of claim 1, wherein the piston head's front surface has a substantially flat shape in an area around the cylinder's center axis and has a concave shape from the flat surface area and radially outwards towards an end edge of the front surface.

10. The piston pump of claim 1, wherein a piston head rest is provided with at least one through-going piston head rest channel in the cylinder's longitudinal direction, which piston head rest channel is in fluid contact with the at least one piston head channel for supply of liquid to the annulus.

11. The piston pump of claim 10, wherein the piston head's rear surface and/or the piston head rest's surface facing the piston head is provided with a ring channel which forms a flow channel for fluid flow when the piston head abuts the piston head rest, and where the at least one piston head channel extends from the annulus to the ring channel and the at least one through-going piston head rest channel discharges into the ring channel.

12. The piston pump of claim 1, wherein at least one piston head rest channel on the rear side of a piston head rest is connected to a fluid supply means for delivery of the pressurized fluid to the annulus.

13. A piston pump comprising:
a housing;
a piston disposed inside the housing, the piston including a piston head having a first projection and a second projection each in contact with an inner wall of the housing such that the first and second projections enclose a cavity between the piston head and the inner wall, wherein at least a portion of the piston head including the first and second projections is formed of a single, continuous piece of elastic material, the piston head includes a fluid conduit in the elastic material, and the fluid conduit terminates at the cavity between the piston head and the inner wall enclosed by the first and second projections.

14. The piston pump of claim 13, wherein the piston head has varying elasticity in that the first and second projections are more elastic than other portions of the piston head.

15. The piston pump of claim 13, wherein the piston includes a piston head rest mounted on a piston rod and the piston head rest abuts the piston head.

16. A method comprising:
operating a piston pump to pump a fluid having solid particles from a working space within a housing of the piston pump, the piston pump including a piston head having first and second projections that are formed as a single continuous piece of elastic material and that contact an inner wall of the housing and enclose a cavity between the piston head and the inner wall;
delivering a flushing fluid to the cavity, wherein delivering the flushing fluid to the cavity includes routing the flushing fluid through a piston head channel that ends at the cavity; and
passing the flushing fluid out of the cavity past the first projection and into the working space.

17. The method of claim 16, wherein delivering the flushing fluid to the cavity includes routing the flushing fluid to the piston head channel through an additional channel in a piston head rest abutting the piston head.

18. The method of claim 17, wherein routing the flushing fluid to the piston head channel through the additional channel in the piston head rest abutting the piston head includes routing the flushing fluid to a transfer channel that is formed between the piston head and the piston head rest and connects the additional channel in the piston head rest with the piston head channel.

19. The method of claim 16, wherein operating the piston pump to pump the fluid from the working space includes operating the piston pump to pump a liquid containing solid particles from the working space.

* * * * *